Dec. 15, 1942.  R. B. TAYLOR  2,304,860
APPARATUS FOR FREEZING FOODS
Filed Sept. 6, 1939  4 Sheets—Sheet 1

Robert B. Taylor
INVENTOR
BY Arthur L. Davis
ATTORNEY

Dec. 15, 1942.    R. B. TAYLOR    2,304,860
APPARATUS FOR FREEZING FOODS
Filed Sept. 6, 1939    4 Sheets-Sheet 2

Robert B. Taylor
INVENTOR
BY Arthur F. Davis
ATTORNEY

Dec. 15, 1942.  R. B. TAYLOR  2,304,860
APPARATUS FOR FREEZING FOODS
Filed Sept. 6, 1939  4 Sheets-Sheet 3

Robert B. Taylor
INVENTOR
BY Arthur L. Davis
ATTORNEY

Dec. 15, 1942.    R. B. TAYLOR    2,304,860
APPARATUS FOR FREEZING FOODS
Filed Sept. 6, 1939    4 Sheets-Sheet 4

Robert B. Taylor
INVENTOR
BY *Arthur L. Davis*
ATTORNEY

Patented Dec. 15, 1942

2,304,860

UNITED STATES PATENT OFFICE 2,304,860

APPARATUS FOR FREEZING FOODS

Robert B. Taylor, near Knoxville, Tenn.

Application September 6, 1939, Serial No. 293,598

11 Claims. (Cl. 62—104)

(Granted under the act of March 3, 1883, as amended April 30, 1928; 370 O. G. 757)

The invention herein described may be manufactured and used by or for the Government for governmental purposes without the payment to me of any royalty thereon.

This invention relates to apparatus for freezing foodstuff materials.

The principal object of this invention is to provide apparatus for freezing foodstuff materials at high speed with units of the material in direct contact with a refrigerant liquid. Another object of this invention is to provide apparatus adapted to provide continuous flow of refrigerant liquid through and around units of foodstuff material in thin layers being frozen at high speed and in direct contact with said refrigerant liquid. A further object of this invention is to provide apparatus adapted to maintain a minimum temperature differential in the refrigerant liquid which contacts the foodstuff material being frozen. A still further object of this invention is to provide apparatus adapted to form an extended body of the foodstuff material and to maintain the position of said body or the movement thereof in definite relationship to the flow of refrigerant liquid. Other objects of this invention include the provision of apparatus adapted to freeze foodstuff materials continuously at high speeds and in an economical manner.

In my copending application Serial No. 217,971, filed July 7, 1938, now United States Patent No. 2,164,362, issued July 4, 1939, I have described and claimed a process of high speed freezing of comestibles. The present invention relates to an apparatus which is particularly adapted for use in carrying out said process.

I have invented apparatus for freezing a comestible by direct contact of the comestible with a refrigerant liquid which comprises the combination of a vessel providing a container for the refrigerant liquid, means for maintaining the temperature of the refrigerant liquid in the vessel below the freezing temperature of the comestible, means for directing a stream of refrigerant liquid through said vessel, a mobile, liquid permeable member adapted to support units of the comestible to be frozen in a body of units having a relatively small dimension, means for supporting at least a portion of said liquid permeable member within said vessel substantially perpendicular to the path of said stream of refrigerant liquid, and means for moving said liquid permeable member and the body of comestible units supported thereby whereby said body of units is caused to be traversed by said stream of refrigerant liquid in the direction of the small dimension of said body.

In the accompanying drawings which form a part of this specification

Figure 1:
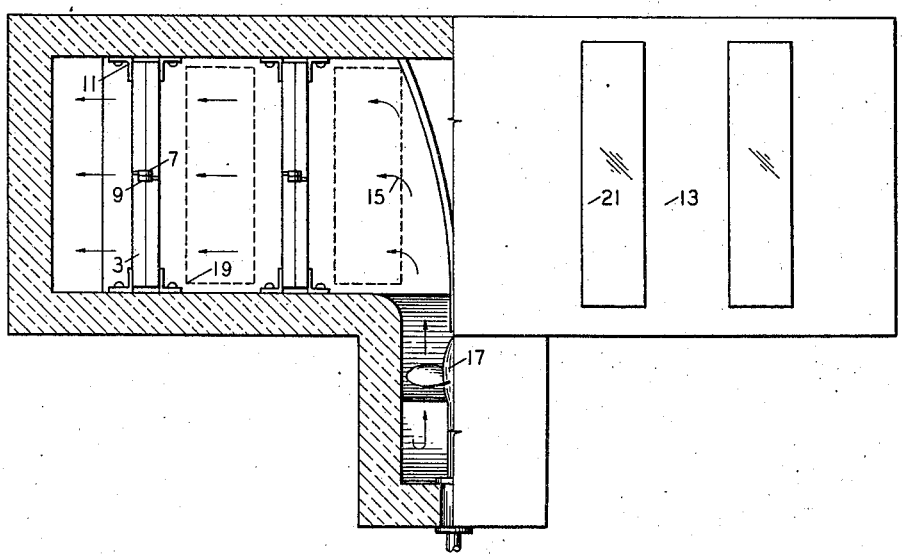
Fig. 1 is a half sectional, half plan view of one form of apparatus for the embodiment of my invention.
Figure 2:
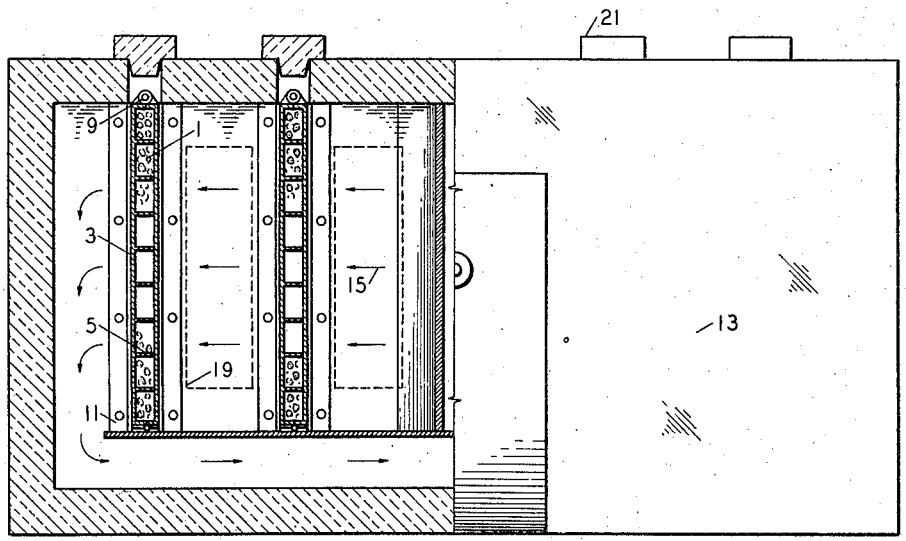
Fig. 2 is a half sectional, half elevational view of the apparatus shown in Fig. 1.

In Fig. 1 and Fig. 2, units of a comestible 1 are placed into a liquid permeable tray 3 with a movable side which is hingedly connected at the bottom to facilitate charging said units into said tray in an extended body of such units having a relatively short dimension in one direction and discharging the comestible so charged. A plurality of shelves, represented by shelf 5, is affixed to one side of the tray 3 and serves to support the individual units of the comestible to be frozen in an extended body of said units having a relatively short dimension in one direction. A member 7 and a member 9, affixed to opposite sides of the tray, provide a means for locking the tray and also are adapted to afford means for raising and lowering the tray within a plurality of guides, represented by guide 11, within a vessel 13. The vessel 13 contains a refrigerant liquid, the circulation of which is indicated by a plurality of arrows, represented by arrow 15, and the circulation of which is actuated by a propeller 17, driven by a motor (not shown), which provides a means for circulating the refrigerant through the liquid permeable trays and the body of the comestible units contained therein in the direction of the relatively short dimension. The interior of the vessel 13 is provided with a plurality of fin coolers, represented by fin cooler 19, which maintains the refrigerant liquid at a temperature below the freezing temperature for the comestible. A plurality of covers, represented by cover 21 is provided in the top of the vessel 13 and such covers are removed and replaced in accommodation with the ingress and egress of the trays.

Figure 3:
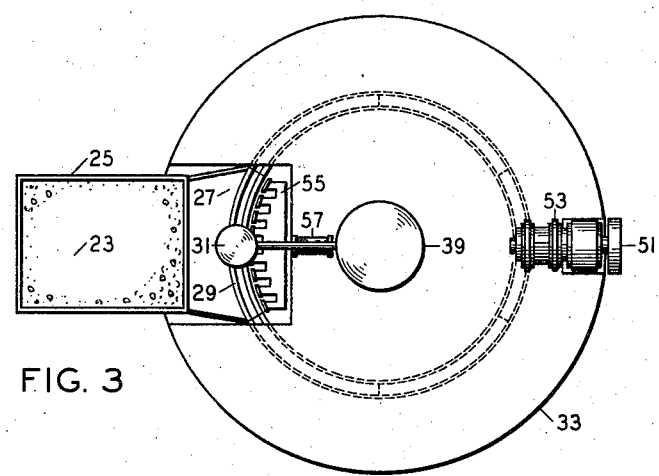
Fig. 3 is a plan view of another form of apparatus for the embodiment of my invention.
Figure 4:
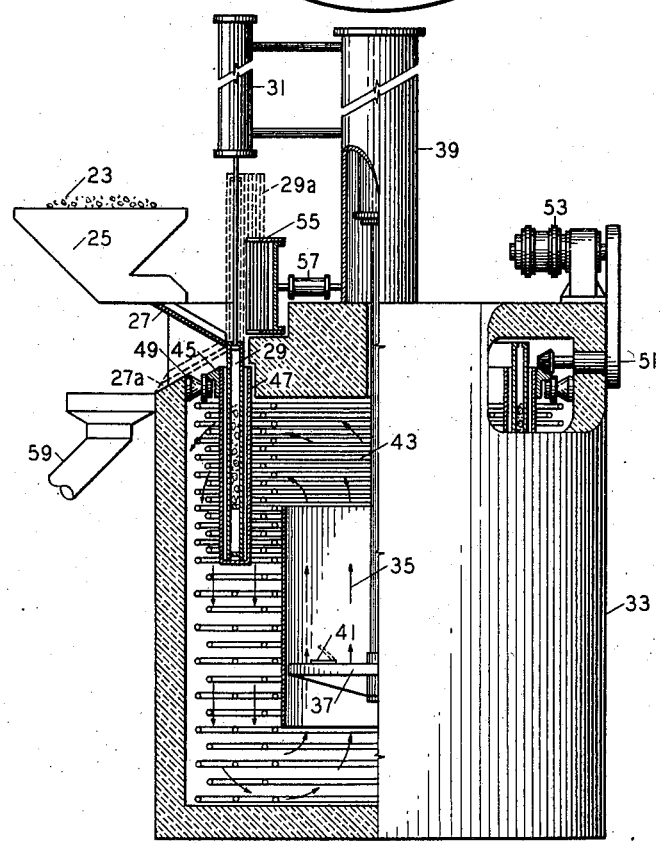
Fig. 4 is a half sectional, half elevational view of the apparatus shown in Fig. 3.

In Fig. 3 and Fig. 4, units of a comestible 23 are fed into a hopper 25 which in turn discharges on a pivoted chute 27. The pivoted chute 27 discharges the comestible into one of a plurality of liquid permeable trays, represented by tray 29, for supporting units of the comestible to be frozen in an extended body of said units having a relatively short dimension in one direction. Said liquid permeable tray is lowered by a cylinder 31, in synchronism with the charging operation, into a vessel 33. The vessel 33 contains a refrigerant liquid, the general circulation of which is indicated by a plurality of arrows, represented by arrow 35, and the circulation of which is actuated by a piston 37 operated by a cylinder 39, which provides a means for circulating the refrigerant through the liquid permeable trays and the body of the comestible units contained therein in the direction of the relatively short dimension. The piston 37 is provided with a plurality of check valves, represented by check valve 41, adapted to admit only a portion of the refrigerant charged during each stroke of the piston as part of the charge to be discharged during the next stroke thereof. In this manner the refrigerant is circulated with a net integrated circulatory motion due to partial reciprocation of the refrigerant. The interior of the vessel 33 is provided with a plurality of cooling pipes, represented by cooling pipe 43, which maintains the refrigerant liquid at a temperature below the freezing temperature for the comestible. The plurality of trays, represented by tray 29, is supported by a bevel gear 45 integral with a liquid permeable housing 47 for the trays. A plurality of trunnions, represented by trunnion 49, supports the bevel gear 45, which is revolved by power transmission equipment 51 driven by a brake operated motor 53 in synchronism with the charging operation. Each tray 29 upon completion of a 360° cycle, having returned to its initial position, is raised by the cylinder 31 to a position indicated by 29a and, in operating integral therewith, the pivoted chute 27 is lowered to a position indicated by 27a. A discharge means 55 operated by a cylinder 57 expels the contents of the tray onto the chute and into a hopper 59 from which it is conveyed to a centrifuge (not shown). After discharge of the contents of the tray the discharge means and the pivoted chute return to their respective initial positions and another cycle is initiated.

Figure 5:
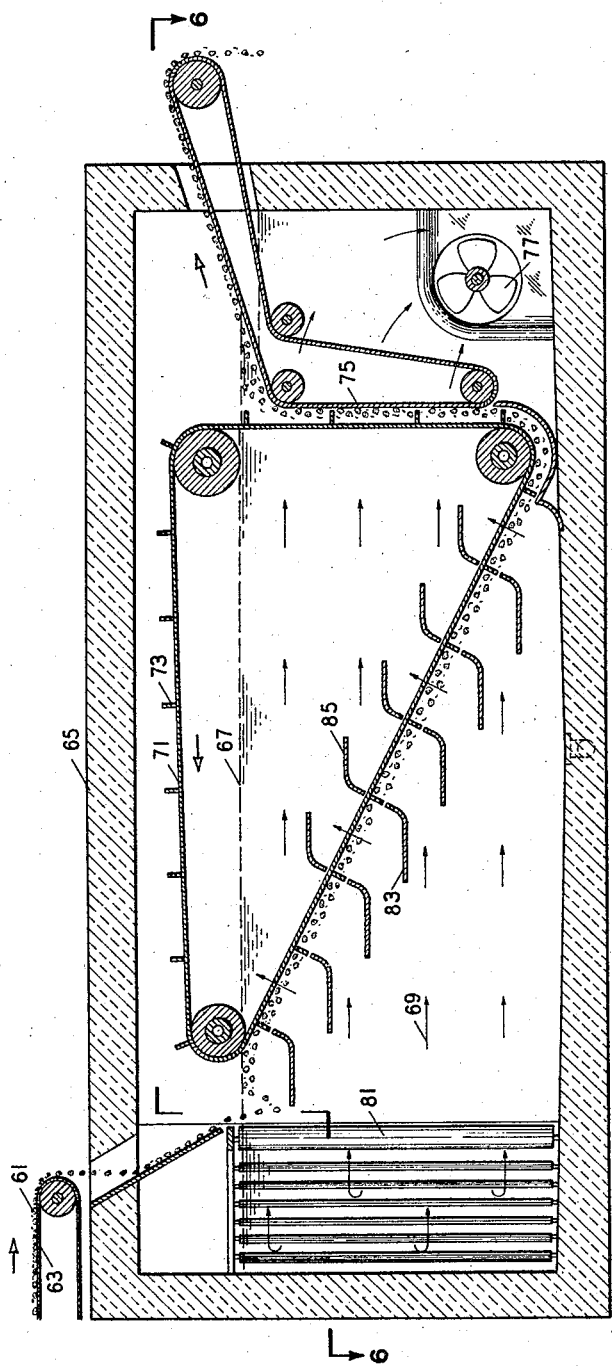
Fig. 5 is an elevational sectional view of another form of apparatus for the embodiment of my invention taken on line 5—5 of Fig. 6.
Figure 6:
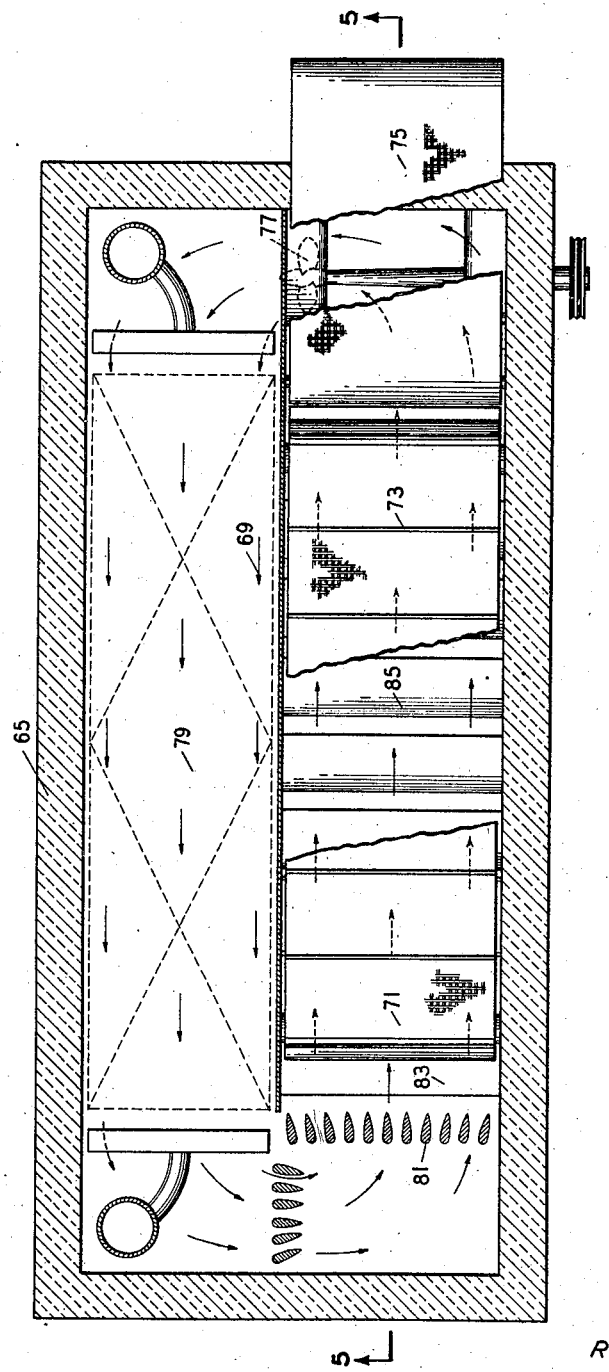
Fig. 6 is a plan sectional view of the apparatus shown in Fig. 5 taken on line 6—6 thereof.

In Fig. 5 and Fig. 6, a comestible 61 supported on a conveyor belt 63 is fed into a thermally insulated vessel 65 containing a refrigerant liquid 67. A differential in head between the charging end of the vessel and the discharging end combined with circulation of the refrigerant liquid, as indicated by a plurality of arrows, represented by arrow 69, conveys the comestible by flotage from the charge end to engagement with a liquid permeable conveyor 71 partly submerged in the refrigerant liquid. A plurality of equally spaced flights, represented by flight 73, is affixed to the conveyor 71 and serves to prevent improper flow of refrigerant liquid adjacent to the zone of change of direction of the liquid permeable conveyor and to retain the comestible and direct the fluid flow of the refrigerant liquid throughout the entire declined and inclined path of travel of the comestible. An inclined liquid permeable conveyor 75 extending from the refrigerant liquid is provided for discharge of the comestible. At the discharge end of the vessel 65 a circulating pump 77 is provided for forcing the refrigerant liquid through a faired evaporator unit 79. The refrigerant liquid 67 emerges from the evaporator 79 at the optimum temperature for recirculation. A plurality of guide vanes, represented by guide vanes 81, 83 and 85, serve to uniformly distribute the flow of liquid and the direction of flow.

It is evident that there are numerous factors which will influence conditions for the most satisfactory operation of my invention, the actual limits of which cannot be set forth except by a detailed knowledge or study of various specific combinations of elements covered by my invention with respect to the character of the comestible to be frozen and the refrigerant liquid used.

One combination of elements embodying my invention is adapted to provide an apparatus wherein units of a comestible are placed in an enclosing liquid permeable means to form an extended body of said units having a relatively short dimension in one direction, the charged liquid permeable means is placed in a circulating refrigerating liquid maintained at proper temperature and rate of circulation through said short dimension of said extended body and, after freezing of the comestible, said charged means is removed from the refrigerant liquid and its contents discharged.

Another combination of elements embodying my invention is adapted to provide an apparatus wherein liquid permeable means, charged with units of a comestible to form an extended body of said units having a relatively short dimension in one direction, is moved through the refrigerant liquid circulated through said short dimension of said extended body to a location adjacent to the point of discharge of the frozen charge from said means, said latter location may or may not coincide with the location for charging said liquid permeable means with units of the unfrozen comestible.

Still another combination of elements embodying my invention is adapted to provide an apparatus wherein the units of the comestible to be frozen are formed in an extended body of said units having a relatively short dimension in one direction, said extended body is moved into and through a zone defined by the position of liquid permeable means on one or more sides of said extended body and conveyed through said zone by said means, and a refrigerant liquid is circulated through said short dimension of said extended body in said zone.

A further combination of elements embodying my invention is adapted to provide an apparatus wherein the units of comestible to be frozen are formed in an extended body of said units having a relatively short dimension in one direction, said extended body is moved into and through a zone substantially defined by the position of liquid permeable means on one side of said extended body and the units of the comestible in part conveyed through said zone by said means, and a refrigerant liquid is circulated through said short dimension of said extended body in said zone and the units of the comestible in part conveyed through said zone by said refrigerant liquid.

As will be seen from the foregoing description, liquid permeable means may be adapted to enclose a relatively thin layer of units of comestible, define a zone through which an extended layer of comestible shall move and/or simultaneously support and define the path of travel through which an extended body of comestible shall move. Such liquid permeable means may be constructed of any suitable material, such as wire, perforated sheet or chain mesh belt, the same being reinforced or not, depending upon the conditions of use. The liquid permeable means may be in the form of trays which are placed in the circulating refrigerant stream or moved through such a stream in a manner such as to cause the refrigerant liquid to traverse the extended body of comestible in the direction of the small dimension thereof. Also the liquid permeable means may be in the form of a belt type or endless traveling conveyor, with or without flights, for submerging and emerging the comestible in such a manner that the extended body of comestible is traversed by the refrigerant liquid in the direction of the small dimension of said body throughout a substantial portion of the path of travel of said extended body on said conveyor. The liquid permeable element of such a conveyor may be such as to describe an inclined, declined, vertical, horizontal, or composite path of travel as circumstances peculiar to the specific conditions require. Under some circumstances a second liquid permeable means positioned to form a support for the extended body of comestible units adjacent to the emergent flight of the first conveyor is provided to convey frozen units of comestible away from said first conveyor. Also, under certain circumstances, a plurality of liquid permeable traveling conveyors may be substituted for the single traveling conveyor referred to above so long as such a plurality of conveyors still maintain the units of comestible in an extended body or a plurality of extended bodies, all of which have relatively short dimensions with such an extended body or bodies adapted to be traversed by the refrigerant liquid in a direction of the relatively short dimension thereof.

The refrigerant liquid may be maintained at a proper temperature by any suitable means. After a proper temperature has been attained the refrigerant liquid should preferably be so distributed in a vessel containing the same that it will flow uniformly through the extended body of units of the comestible substantially in the direction of the short dimension thereof. Guide vanes may be provided in said vessel at suitable locations, such as adjacent to the refrigerant liquid inlet to the conveyor compartment of the vessel and adjacent to either side or both sides of the traveling conveyor and the extended body of units of comestible thereon. In some installations it has been found particularly effective to position the means for cooling said liquid adjacent to a location where said liquid passed through the liquid permeable means or the extended body of units of the comestible, whichever occurs first, depending upon the particular combination of elements. When the circulation of the refrigerant liquid is periodically reversed, it is particularly effective to have means for cooling the refrigerant on both sides of said extended body of comestible.

The circulation of the refrigerant liquid may also be effected by any suitable means. The circulation provided may be continuous in one direction or may be a net integrated circulatory motion as a result of partial reciprocation of the flow of the refrigerant liquid, depending upon the specific character or type of liquid permeable means used. The former is preferable where used in connection with the traveling conveyor which is adjacent to only one side of an extended body of units of a comestible and defines the path thereof, while the latter is preferable where the liquid permeable means is adjacent to both sides of said extended body of units of a comestible having a relatively short dimension.

The extended body of units of the comestible may be formed or moved in a vertical, horizontal, or angular position, so long as the flow of the refrigerant liquid is through the relatively short dimension of such extended body or at least substantially so.

This application is a continuation-in-part of my application Serial No. 237,473, filed October 28, 1938.

I claim:

1. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) a mobile, liquid permeable member adapted to support units of the comestible to be frozen in a body of units having a relatively small dimension, (e) means for supporting at least a portion of said liquid permeable member within said vessel below the surface of said body of refrigerant liquid and substantially perpendicular to the path of said stream of refrigerant liquid, and (f) means for moving said liquid permeable member and the body of comestible units supported thereby through said body of refrigerant liquid transversely of said stream of refrigerant liquid and with the liquid permeable member positioned to support the body of comestible units against displacement in the direction of flow of said stream of refrigerant liquid, whereby said body of units is caused to be traversed by said stream of refrigerant liquid in the direction of the small dimension of said body.

2. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) a mobile, liquid permeable member adapted to support units of the comestible to be frozen in a body of units having a relatively small dimension in the direction perpendicular to said member, (e) means for supporting at least a portion of said liquid permeable member within said vessel below the surface of said body of refrigerant liquid and substantially perpendicular to the path of said stream of refrigerant liquid, and (f) means for moving said liquid permeable member and the body of comestible units supported thereby through said body of refrigerant liquid transversely of said stream of refrigerant liquid and with the liquid permeable member positioned to support the body of comestible units against displacement in the direction of flow of said stream of refrigerant liquid, whereby said body of units is caused to be traversed by said stream of refrigerant liquid in the direction of the small dimension of said body.

3. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) an endless mobile, liquid permeable conveyor member adapted to support units of the comestible to be frozen in a body of units having a relatively small dimension in the direction perpendicular to said member, (e) means for supporting at least a portion of said liquid permeable member within said vessel below the surface of said body of refrigerant liquid and substantially perpendicular to the path of said stream of refrigerant liquid, and (f) means for moving said liquid permeable member and the body of comestible units supported thereby through said body of refrigerant liquid transversely of said stream of refrigerant liquid and with the liquid permeable member positioned to support the body of comestible units against displacement in the direction of flow of said stream of refrigerant liquid, whereby said body of units is caused to be traversed by said stream of refrigerant liquid in the direction of the small dimension of said body.

4. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) an endless mobile, liquid permeable conveyor member adapted to support units of the comestible to be frozen in a body of units having a relatively small dimension in the direction perpendicular to said member, (e) means supporting said conveyor member to provide a flight thereof within said vessel below the surface of said body of refrigerant liquid and substantially perpendicular to the path of said stream of liquid, and (f) means for moving said liquid permeable member and the body of comestible units supported thereby through said body of refrigerant liquid transversely of said stream of refrigerant liquid and with the liquid permeable member positioned to support the body of comestible units against displacement in the direction of flow of said stream of refrigerant liquid, whereby said body of units is caused to be traversed by said stream of refrigerant liquid in the direction of the small dimension of said body.

5. In an apparatus for freezing a comestible by direct contact of the comestible with a body of refrigerant liquid, (a) a vessel providing a container for the body of refrigerant liquid, (b) means for maintaining the temperature of the refrigerant liquid, in the vessel below the freezing temperature of the comestible, (c) means for directing a stream of said refrigerant liquid through said vessel within said body of refrigerant liquid, (d) a mobile, liquid permeable member provided with spaced upstanding members adapted to form units of the comestible to be frozen into a body of units having a relatively small dimension in the direction perpendicular to said member, (e) means for supporting at least a portion of said liquid permeable member within said vessel below the surface of said body of refrigerant liquid and substantially perpendicular to the path of said stream of refrigerant liquid, and (f) means for moving said liquid permeable member and the body of comestible units supported thereby through said body of refrigerant liquid transversely of said stream of refrigerant liquid and with the liquid permeable member positioned to support the body of comestible units against displacement in the direction of flow of said stream of refrigerant liquid, whereby said body of units is caused to be traversed by said stream of refrigerant liquid in the direction of the small dimension of said body.

6. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) an endless mobile, liquid permeable conveyor member adapted to support units of the comestible to be frozen in a body of units having a relatively small dimension in the direction perpendicular to said member, (e) means supporting said conveyor member to provide a submergent flight thereof within said vessel below the surface of said body of refrigerant liquid and substantially perpendicular to the path of said stream of liquid, and (f) means for moving said liquid permeable member and the body of comestible units supported thereby through said body of refrigerant liquid transversely of said stream of refrigerant liquid and with the liquid permeable member positioned to support the body of comestible units against displacement in the direction of flow of said stream of refrigerant liquid, whereby said body of units is caused to be traversed by said stream of refrigerant liquid in the direction of the small dimension of said body.

7. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) an endless mobile, liquid permeable conveyor member adapted to support units of the comestible to be frozen in a body of units having a relatively small dimension in the direction perpendicular to said member, (e) means supporting said conveyor member to provide an inclined submergent flight thereof within said vessel below the surface of said body of refrigerant liquid and substantially perpendicular to the path of said stream of liquid, and (f) means for moving said liquid permeable member and the body of comestible units supported thereby through said body of refrigerant liquid transversely of said stream of refrigerant liquid and with the liquid permeable member positioned to support the body of comestible units against displacement in the direction of flow of said stream of refrigerant liquid, whereby said body of units is caused to be traversed by said stream of refrigerant liquid in the direction of the small dimension of said body.

8. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) an endless mobile, liquid permeable conveyor member adapted to support units of the comestible to be frozen in a body of units having a relatively small dimension in the direction perpendicular to said member, (e) means supporting said conveyor member to provide a submergent and an emergent flight thereof within said vessel below the surface of said body of refrigerant liquid and substantially perpendicular to the path of said stream of liquid, (f) a second liquid permeable conveyor member having a flight spaced from the emergent flight of said first named conveyor member and positioned to form a support for said body of comestible units adjacent said emergent flight, and (g) means for moving said first named liquid permeable member and the body of comestible units supported thereby through said body of refrigerant liquid, whereby said body of units is caused to be traversed by said stream of refrigerant liquid in the direction of the small dimension of said body.

9. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, (d) an endless, mobile, liquid permeable conveyor member adapted to support units of the comestible to be frozen in a body of units having a relatively small dimension in the direction perpendicular to said member, (e) means supporting said conveyor member to provide a submergent and an emergent flight thereof within said vessel below the surface of said body of refrigerant liquid and substantially perpendicular to the path of said stream of liquid, (f) a second liquid permeable conveyor member having a flight spaced from the emergent flight of said first named conveyor member and positioned to form a support for said body of comestible units adjacent said emergent flight and a flight adapted to convey frozen units of comestible out of said vessel, and (g) means for moving said first named liquid permeable member and the body of comestible units supported thereby through said body of refrigerant liquid, whereby said body of units is caused to be traversed by said stream of refrigerant liquid in the direction of the small dimension of said body.

10. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, and (d) means for forming units of the comestible to be frozen into an extended readily permeable relatively thin layer and for advancing said layer of comestible units through said vessel below the surface of said body of refrigerant liquid and in a path substantially perpendicular to said stream of refrigerant liquid while supporting said layer of comestible units against displacement in the direction of flow of said stream of refrigerant liquid, whereby said layer is caused to be traversed by said stream of refrigerant liquid in the direction of the small dimension thereof.

11. In an apparatus for freezing a comestible by direct contact of the comestible with a body of refrigerant liquid, (a) a vessel providing a container for the body of refrigerant liquid, (b) means for maintaining the temperature of the refrigerant liquid in the vessel below the freezing temperature of the comestible, (c) means for directing a stream of said refrigerant liquid through said vessel within said body of refrigerant liquid, and (d) a traveling liquid permeable conveyor having means for forming units of the comestible to be frozen into an extended readily permeable relatively thin layer and for advancing said layer of comestible units through said vessel below the surface of said body of refrigerant liquid and in a path substantially perpendicular to said stream of refrigerant liquid while supporting said layer of comestible units against displacement in the direction of flow of said stream of refrigerant liquid, whereby said layer is caused to be traversed by said stream of refrigerant liquid in the direction of the small dimension thereof.

ROBERT B. TAYLOR.